United States Patent
Avanes et al.

(10) Patent No.: US 11,886,441 B2
(45) Date of Patent: Jan. 30, 2024

(54) TAG-BASED DATA GOVERNANCE AUDITING SYSTEM

(71) Applicant: Snowflake Inc., Bozeman, MT (US)

(72) Inventors: Artin Avanes, Palo Alto, CA (US); Khalid Zaman Bijon, Santa Cruz, CA (US); Yujie Li, Santa Clara, CA (US); Zheng Mi, Palo Alto, CA (US); Subramanian Muralidhar, Mercer Island, WA (US); David Schultz, Piedmont, CA (US)

(73) Assignee: Snowflake Inc., Bozeman, MT (US)

( * ) Notice: Subject to any disclaimer, the term of this patent is extended or adjusted under 35 U.S.C. 154(b) by 0 days.

(21) Appl. No.: 18/052,990

(22) Filed: Nov. 7, 2022

(65) Prior Publication Data

US 2023/0062496 A1    Mar. 2, 2023

Related U.S. Application Data

(63) Continuation of application No. 17/689,463, filed on Mar. 8, 2022, now Pat. No. 11,514,057, which is a (Continued)

(51) Int. Cl.
    *G06F 16/2457*    (2019.01)
    *G06F 16/21*      (2019.01)
    (Continued)

(52) U.S. Cl.
    CPC ...... *G06F 16/24573* (2019.01); *G06F 16/211* (2019.01); *G06F 16/212* (2019.01);
    (Continued)

(58) Field of Classification Search
    CPC .. G06F 16/24573; G06F 16/27; G06F 16/289; G06F 16/2291; G06F 16/211; G06F 16/212; G06F 16/288; G06F 16/2365
    (Continued)

(56) References Cited

U.S. PATENT DOCUMENTS

8,817,411 B1    8/2014    Sims et al.
9,300,737 B1    3/2016    Agsen et al.
(Continued)

FOREIGN PATENT DOCUMENTS

WO    WO-2022/093339 A1    5/2022

OTHER PUBLICATIONS

"U.S. Appl. No. 17/102,156, Decision on Pre-Appeal Brief Request for Review dated Oct. 8, 2021", 2 pgs.
(Continued)

*Primary Examiner* — Shahid A Alam
(74) *Attorney, Agent, or Firm* — Schwegman Lundberg & Woessner, P.A.

(57) ABSTRACT

A method of implementing object tagging framework starts with the processor receiving a tag creation command including a tag name. In response to the tag creation command, the processor creates a current tag. The processor then receives an association command, the tag name and a source object identifier. The processor determines a source object associated with the source object identifier. The source object includes a tag value. The processor associates the current tag with the source object. The processor receives a replication command including the source object and a target object. The processor causes replication of the source object to the target object that comprises replicating the current tag with the tag name and the tag value in the source object to the target object. Other embodiments are also described herein.

20 Claims, 10 Drawing Sheets

Related U.S. Application Data continuation of application No. 17/160,960, filed on Jan. 28, 2021, now Pat. No. 11,301,478.

(60) Provisional application No. 63/108,215, filed on Oct. 30, 2020.

(51) Int. Cl.
    *G06F 16/23*   (2019.01)
    *G06F 16/22*   (2019.01)
    *G06F 16/28*   (2019.01)
    *G06F 16/27*   (2019.01)

(52) U.S. Cl.
    CPC ...... *G06F 16/2291* (2019.01); *G06F 16/2365* (2019.01); *G06F 16/27* (2019.01); *G06F 16/288* (2019.01); *G06F 16/289* (2019.01)

(58) Field of Classification Search
    USPC .......................................................... 707/769
    See application file for complete search history.

(56) References Cited

U.S. PATENT DOCUMENTS

| | | | |
|---|---|---|---|
| 10,439,897 | B1 | 10/2019 | Komarla et al. |
| 10,853,330 | B2 | 12/2020 | Lee |
| 11,301,478 | B1 | 4/2022 | Avanes et al. |
| 11,514,057 | B2 | 11/2022 | Avanes et al. |
| 2003/0236797 | A1 | 12/2003 | Nita |
| 2006/0117179 | A1* | 6/2006 | Karabulut ............. H04L 9/3265 713/175 |
| 2006/0248112 | A1* | 11/2006 | Williams ............ G06F 9/44505 707/999.102 |
| 2006/0248449 | A1* | 11/2006 | Williams ................ G06F 9/451 715/209 |
| 2009/0210458 | A1 | 8/2009 | Glover et al. |
| 2009/0259701 | A1 | 10/2009 | Wideman et al. |
| 2010/0057790 | A1 | 3/2010 | Johnson |
| 2011/0282836 | A1 | 11/2011 | Erickson et al. |
| 2011/0314528 | A1 | 12/2011 | Dolin |
| 2012/0030179 | A1 | 2/2012 | Kauffman et al. |
| 2012/0304113 | A1* | 11/2012 | Patten ................. G06F 3/04847 715/800 |
| 2013/0290377 | A1 | 10/2013 | Purohit |
| 2015/0019576 | A1* | 1/2015 | Seneski ................ G06F 40/149 707/755 |
| 2015/0100924 | A1* | 4/2015 | Matas ..................... G06T 15/60 715/835 |
| 2016/0098574 | A1 | 4/2016 | Bargagni |
| 2017/0123935 | A1 | 5/2017 | Pandit et al. |
| 2017/0257380 | A1* | 9/2017 | Yao ......................... H04L 63/10 |
| 2017/0295190 | A1 | 10/2017 | Brown |
| 2018/0060413 | A1* | 3/2018 | Dai ....................... G06F 16/285 |
| 2018/0067951 | A1* | 3/2018 | Brandwine ........... G06F 16/907 |
| 2018/0139156 | A1* | 5/2018 | Kumar ................... G06Q 10/10 |
| 2019/0146616 | A1* | 5/2019 | White ................. G06F 11/3438 715/704 |
| 2019/0332487 | A1 | 10/2019 | Fair |
| 2019/0362290 | A1 | 11/2019 | Rogynskyy et al. |
| 2020/0186359 | A1* | 6/2020 | Chan ..................... H04L 9/3273 |
| 2020/0402625 | A1* | 12/2020 | Aravamudan .......... G06F 21/64 |
| 2021/0150439 | A1* | 5/2021 | Markham ....... G06Q 10/063114 |
| 2021/0182252 | A1* | 6/2021 | Arlt ..................... G06F 21/6227 |
| 2021/0328957 | A1* | 10/2021 | Delp ................... H04L 12/1818 |
| 2022/0138206 | A1 | 5/2022 | Avanes et al. |
| 2022/0197912 | A1 | 6/2022 | Avanes et al. |

OTHER PUBLICATIONS

"U.S. Appl. No. 17/102,156, Examiner Interview Summary dated Jul. 15, 2022", 2 pgs.

"U.S. Appl. No. 17/102,156, Final Office Action dated Feb. 25, 2022", 17 pgs.

"U.S. Appl. No. 17/102,156, Final Office Action dated May 11, 2021", 7 pgs.

"U.S. Appl. No. 17/102,156, Final Office Action dated Sep. 27, 2022", 18 pgs.

"U.S. Appl. No. 17/102,156, Non Final Office Action dated Feb. 16, 2021", 14 pgs.

"U.S. Appl. No. 17/102,156, Non Final Office Action dated Jun. 9, 2022", 18 pgs.

"U.S. Appl. No. 17/102,156, Non Final Office Action dated Oct. 15, 2021", 7 pgs.

"U.S. Appl. No. 17/102,156, Pre-Appeal Brief Request filed Aug. 11, 2021", 5 pgs.

"U.S. Appl. No. 17/102,156, Response filed Jan. 18, 2022 to Non Final Office Action dated Oct. 15, 2021", 16 pgs.

"U.S. Appl. No. 17/102,156, Response filed Apr. 30, 2021 to Non Final Office Action dated Feb. 16, 2021", 17 pgs.

"U.S. Appl. No. 17/102,156, Response filed May 25, 2022 to Final Office Action dated Feb. 25, 2022", 14 pgs.

"U.S. Appl. No. 17/102,156, Response filed Sep. 9, 2022 to Non Final Office Action dated Jun. 9, 2022", 14 pgs.

"U.S. Appl. No. 17/160,960, Final Office Action dated Sep. 9, 2021", 14 pgs.

"U.S. Appl. No. 17/160,960, Non Final Office Action dated May 26, 2021", 13 pgs.

"U.S. Appl. No. 17/160,960, Notice of Allowance dated Dec. 29, 2021", 10 pgs.

"U.S. Appl. No. 17/160,960, Response filed Aug. 26, 2021 to Non Final Office Action dated May 26, 2021", 10 pgs.

"U.S. Appl. No. 17/160,960, Response filed Dec. 9, 2021 to Final Office Action dated Sep. 9, 2021", 9 pgs.

"U.S. Appl. No. 17/689,463, Examiner Interview Summary dated Jul. 15, 2022", 2 pgs.

"U.S. Appl. No. 17/689,463, Non Final Office Action dated May 10, 2022", 13 pgs.

"U.S. Appl. No. 17/689,463, Notice of Allowability dated Aug. 30, 2022", 6 pgs.

"U.S. Appl. No. 17/689,463, Notice of Allowance dated Aug. 24, 2022", 11 pgs.

"U.S. Appl. No. 17/689,463, Response filed Aug. 8, 2022 to Non Final Office Action dated May 10, 2022", 8 pgs.

"International Application Serial No. PCT/US2021/040001, International Search Report dated Aug. 10, 2021", 2 pgs.

"International Application Serial No. PCT/US2021/040001, Written Opinion dated Aug. 10, 2021", 5 pgs.

"Unity Answers, Is there an easy way to apply the same tag to all children of an object?", [online]. Retrieved from the Internet:<URL: https://answers.unity.com/questions/167644/is-there-an-easy-way-to-apply-the-same-tag-to-all.html>, (2015), 4 pgs.

Leach, P, et al., "A Universally Unique IDentidier (UUID) URN Namespace", RFC 4122, [online] Retrieved from Internet: <http://www.ietf.org/rfc/rfc4122.txt.pdf>, (2005), 32 pgs.

"U.S. Appl. No. 17/102,156, Non Final Office Action dated Jan. 26, 2023", 18 pgs.

"U.S. Appl. No. 17/102,156, Response filed Dec. 27, 2022 to Final Office Action dated Sep. 27, 2022", 13 pgs.

"U.S. Appl. No. 17/102,156, Examiner Interview Summary dated May 10, 2023", 2 pgs.

"U.S. Appl. No. 17/102,156, Final Office Action dated May 9, 2023", 18 pgs.

"U.S. Appl. No. 17/102,156, Response filed Apr. 26, 2023 to Non Final Office Action dated Jan. 26, 2023", 13 pgs.

"International Application Serial No. PCT/US2021/040001, International Preliminary Report on Patentability dated May 11, 2023", 7 pgs.

\* cited by examiner

TAG-BASED DATA GOVERNANCE AUDITING SYSTEM

CROSS-REFERENCE TO RELATED APPLICATIONS

This patent application is a Continuation of U.S. patent application Ser. No. 17/689,463, filed Mar. 8, 2022, which is a Continuation of U.S. patent application Ser. No. 17/160,960, filed Oct. 30, 2020 and now issued as U.S. Pat. No. 11,301,478, which claims the benefit of U.S. Provisional Patent Application No. 63/108,215, filed Oct. 30, 2020, all of which are incorporated by reference herein in their entireties.

TECHNICAL FIELD

The present disclosure relates systems, methods, and devices for databases and more particularly relates to customer-defined object tagging.

BACKGROUND

Databases are widely used for data storage and access in computing applications. Databases may include tables having rows and columns that include or reference data that can be read, modified, or deleted using queries.

In some instances, organizations, that collect data from disparate databases, and analyze and share that data with consumers and providers, face a number of data governance requirements such as retention policy, data sovereignty, auditing, anonymization, attribution, a variety of compliance regimes, etc. Currently, the organizations are forced to utilize cumbersome naming schemes, comment fields and workflows in order to manage and analyze data in scale and to achieve the many data governance requirements.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some embodiments are illustrated by way of example, and not limitation, in the figures of the accompanying drawings in which.

DETAILED DESCRIPTION

Databases can store enormous sums of data in an organized manner for providers and customer across a networked environment. In order to maintain order with the data volumes doubling or tripling every year, there is a need to deal with the metadata associated with the data in order to categorize, govern, and keep track of the data such that it can be usable.

Among other things, embodiments described in the present disclosure improve the functionality of the database service system 100 by implementing an object tagging framework. A tag is a user-defined portion of metadata that can be attached to or detached from one or more metadata objects in the database service system 100. Using the tag, organizations, providers, and consumers can effectively categorize data or objects and perform various management tasks on these data or objects.

Figure 1:
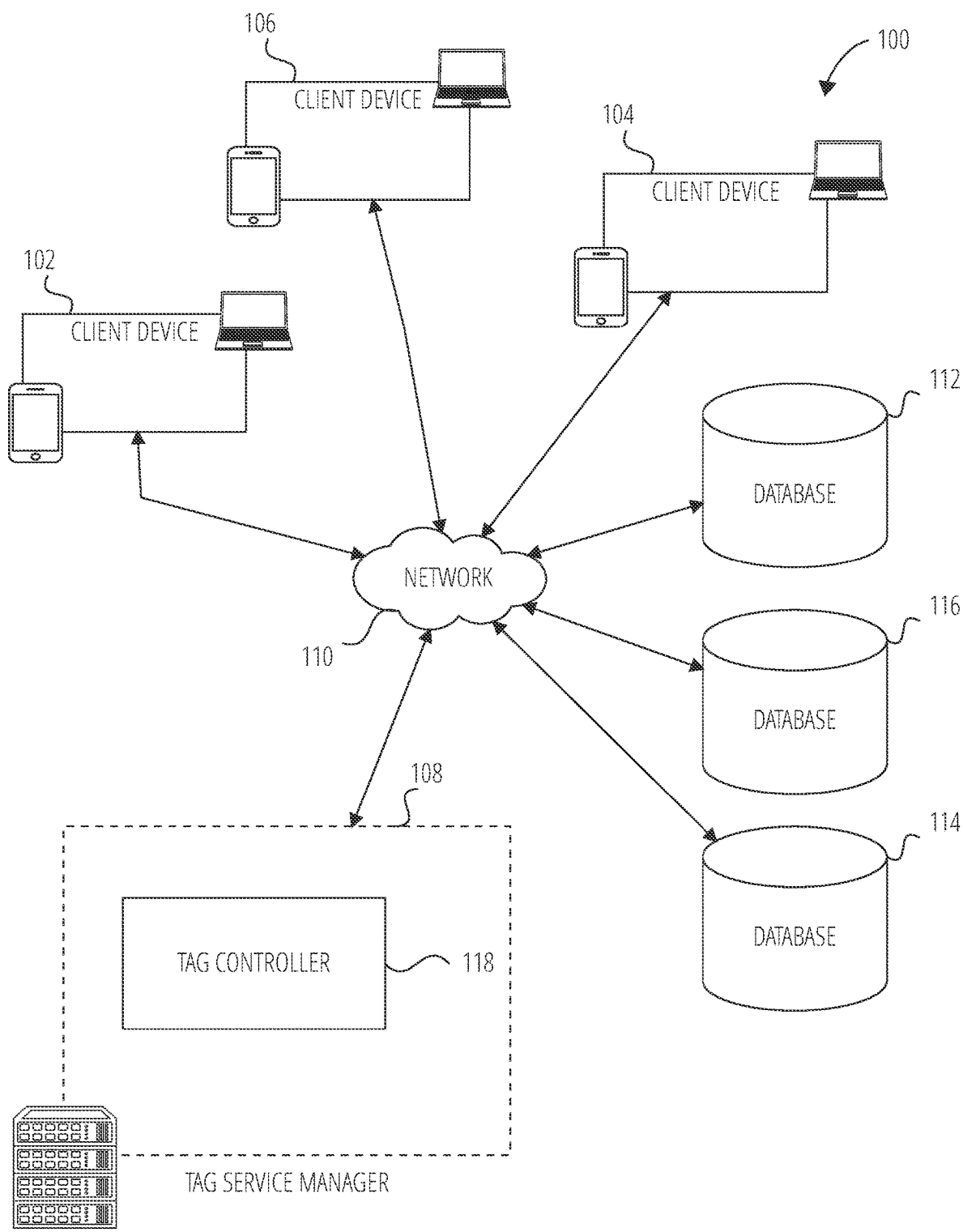
FIG. 1 is a diagrammatic representation of a networked environment in which the present disclosure may be deployed, in accordance with some examples.

FIG. 1 is a diagrammatic representation of a networked environment in which the present disclosure may be deployed, in accordance with some examples. The database service system 100 in FIG. 1 is a processing platform that provides for database services. In one embodiment, the database service system 100 can implement an object tagging framework.

The database service system 100 includes a tag service manager 108 that is accessible by multiple users via a network 110 (e.g., the Internet). The users can access the tag service manager 108 using client device 102, client device 106, and client device 104, respectively. Tag service manager 108 can support any number of users desiring access to data or services of the database service system 100. The users of client devices 102, 104, 106 may include, for example, end users providing data storage and retrieval queries and requests, system administrators managing the systems and methods described herein, software applications that interact with a database, and other components/devices that interact with tag service manager 108.

The tag service manager 108 may provide various services and functions that support the operation of the systems and components within the processing platform. The tag service manager 108 has access to stored metadata associated with the data stored throughout database service system 100. In some embodiments, metadata includes a summary of data stored in remote data storage systems (e.g., database 112, database 116, database 114, etc.) as well as data available from a local cache. Additionally, metadata may include information regarding how data is organized in the remote data storage systems and the local caches.

Tag service manager 108 is further in communication with a plurality of data storage devices including database 112, database 116, and database 114 to perform various data storage and data retrieval operations. Although three databases 112, 114, and 116 are shown in FIG. 1, the database service system 100 is capable of including any number of data storage devices. In some embodiments, databases 112, 114, and 116 are cloud-based storage devices located in one or more geographic locations. For example, databases 112, 114, and 116 may be part of a public cloud infrastructure or a private cloud infrastructure, or any other manner of distributed storage system. Databases 112, 114, and 116 may include hard disk drives (HDDs), solid state drives (SSDs), storage clusters, or any other data storage technology. Additionally, while not shown, the databases 112, 114, and 116 can be comprised in a storage platform that may further include a distributed file system (such as Hadoop Distributed File Systems (HDFS)), object storage systems, and the like.

While the tag service manager 108 and the databases 112, 114, 116 are shown in FIG. 1 as individual components, each of the tag service manager 108 and the databases 112, 114, 116 may be implemented as a distributed system (e.g., distributed across multiple systems/platforms at multiple geographic locations) or may be combined into one or more systems.

As shown in FIG. 1, the tag service manager 108 includes a tag controller 118 that implements the object tagging framework in the database service system 100, according to some embodiments. The object tagging framework provides a mechanism to attach annotations in the form of tags to data and objects within the database service system 100. An object within database service system 100 can be an entity such as, schema objects (e.g., tables, views, materialized views (MVs), pipes, streams, functions, procedures, etc.), databases, schemas, warehouses, accounts, users, roles, columns and constraints, sessions, etc.

TAG DESCRIPTION

A tag can be a customer supplied extensible metadata for an object such that the customer can associate a tag (e.g., cost_center) and a corresponding value (e.g., sales) with an object (e.g., database). In one example, the tag is a schema-level entity and therefore, the tag names are unique within the schema. The tag can also be associated with an entity outside of its own schema.

In another example, the tag can be associated with other entities such as databases and tables, or with account-level entities like warehouses, or with organization-level entities. The tag can also be associated with an account or a column within a table.

In one example, when the customer attaches a tag to the object, a global unique identification (ID) that is assigned to that tag is being attached to the object. The tag has a name that is unique in the entity and a data type (e.g., string, boolean, integer, double, array, structured tag, enumerated values, etc.). The tag can also have one or more possible object types that are the target of the tag.

The tag can also support an implicit lineage or hierarchy. Examples of the different kinds of lineage or hierarchy include:
1. Sub-object lineage (Sub-object→Object→Schema→Database→Account→Organization). Example: Column→Table→Schema→Database→ . . .
2. Schema-object lineage. (Object→Schema→Database→Account→Organization)
3. Session lineage (Session→User→Account→Organization)
4. User lineage (User→Account→Organization)
5. Warehouse lineage (Warehouse→Account→Organization)
6. Account lineage (Account→Organization)
7. Organization lineage Tag Management The tag controller 118 can provide the ability to create a tag, read a tag, modify some properties of a tag and delete a tag. In one example, the tag controller 118 can manage the tags based on instructions received from the client devices 102, 104, 106. For example, the data description language (DDL) syntax (e.g., Create, Alter and Drop) can be used to manage the tags. "Create Tag" can be used to create a tag, "Alter Tag" can be used to set or update the comment of a tag or renaming the tag, and "Drop Tag" can be used to drop an existing tag. In one example, a tag can be prevented from dropping if the tag is attached to an entity. In this example, before dropping a tag, the tag controller 118 may require that all existing associations be removed.

In one example, a customer can create a tag called Personally Identifiable Information (PII). A tag, for instance, can be a dictionary object that is stored as the following data persistence object TagDPO which extends BaseDictionaryDPO. A high-level class Tag represents a tag in the system and accesses the tag using a data persistence object TagDAO. TagDPO can also store the type of data the tag supports as a field.

Tag Mapping Management or Association

Once a tag has been created, tag controller 118 can receive and execute commands (or syntax) that cause tags to be assigned to or unassigned from objects within database service system 100. For example, the commands "Set Tag" and "Unset Tag" can be used to associate a tag with and dissociate a tag from objects, respectively. In one example, a tag is generally set with a value, but if a value is not specified, it is considered that the value is an empty value. Further, if the entity already has the same tag association with a different value, the command "Set Tag" will replace the old value with the new one.

In one example, given a column ADDRESS of a table EMPLOYEE_INFO, customer can assign PII tag to the column ADDRESS with a value ADDRESS.

TagObjectMappingDPO, for instance, stores the mapping of a tag and a corresponding value to an object, e.g., table. In another example, in order to perform tag mapping management, the tag controller 118 stores the tag account identification (ID), the tag ID, the entity account ID, the entity domain ID, and the entity ID in a DPO slice format. This ensures that the tag persists across accounts and platforms.

Tag Association Discovery

Another main component of the object tagging framework is the listing the tags and each tag's associations. A proper Application Programming Interface (API) is provided where users can discover existing tags and their associations with objects.

In order to access a list of existing tags, the customers can use the show command (e.g., Show Tags) which causes the tag controller 118 to cause a list of tags for the current or specified database or schema or across the entire account to be displayed (or showed) on client devices 102, 104, 106. The customers can also submit the describe command (or information function) to cause the tag controller 118 to provide a description of the given tag or describe all tags associated with an object.

In another example, the customers can get a tag on an entity by using the "Get Tag" or "Get Local Tag" functions. For instance, the tag controller 118 can receive the get tag function with a tag name, an entity domain and an entity name as strings and returns the value associated with the entity.

Alternatively, the customers can perform tag-based entity discovery by using a "tag references" command that causes the tag controller 118 to find all the objects having a given tag associated therewith. For instance, the customers can locate or enumerate entities based on tags or other attributes. In one example, the customers can request and be presented with all entities having a tag "sensitivity" that has a value of "Personally Identifiable Information (PII)". In another example, the customers can request and be presented with all entities having a tag "regulatory_regime" that has a value of "EuropeanUnion".

On a more granular level, the customers can also, in another example, list all tables in a specific schema (e.g., the SalesData schema) that have tag (e.g., "product_line") set to a given value (e.g., "productX"). The tag-based entity discovery can also further allow customers to perform auditing of the database service system 100. For instance, the customers can request and obtain a list of all of the columns where tag "sensitivity" has value "PII", but which do not have the masking policy pii_masking_compliance_policy.

Figure 2:
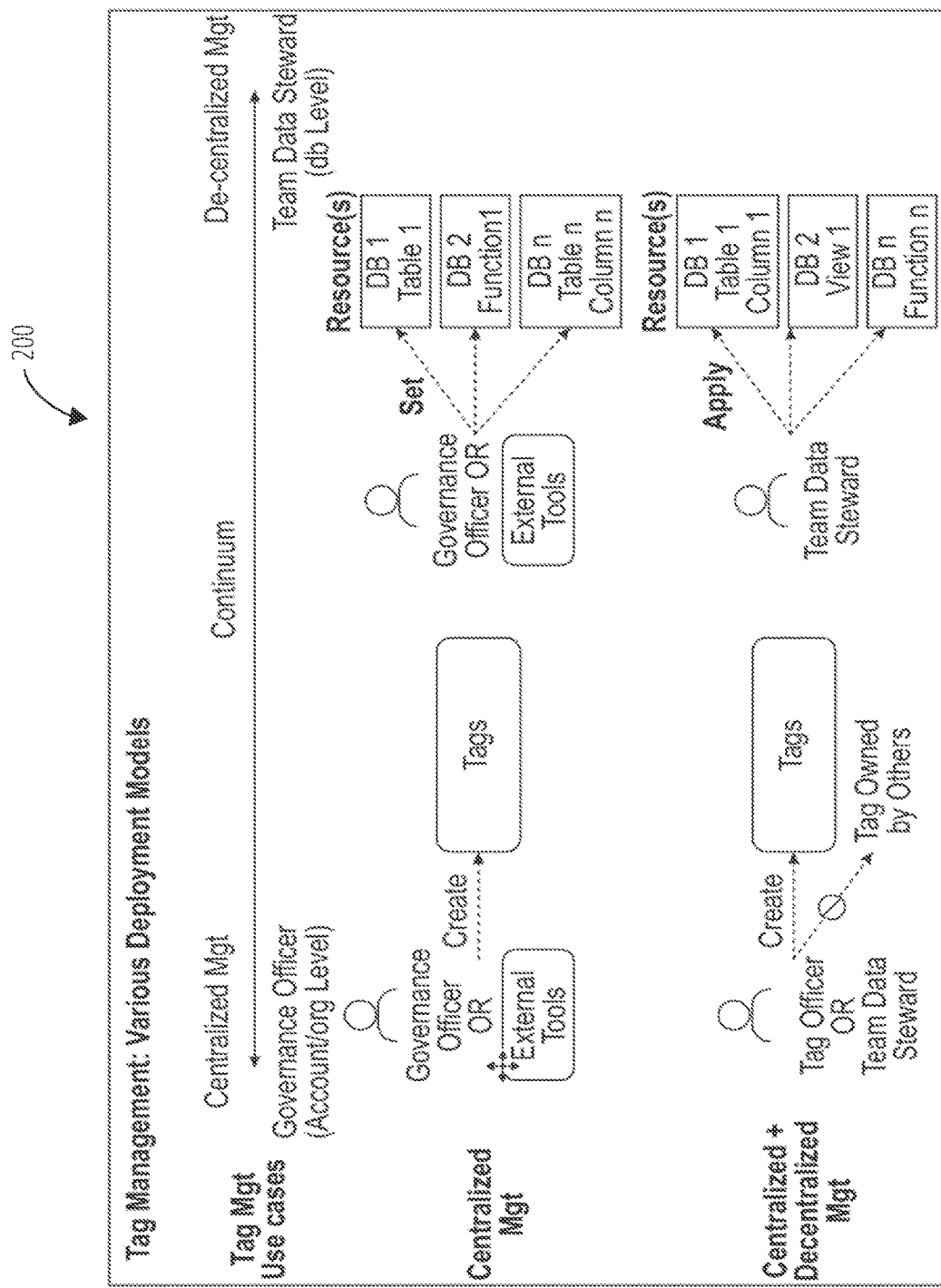
FIG. 2 illustrates a diagrammatic representation of tag management models within the object tagging framework that can be implemented by the tag controller, in accordance with some examples.

FIG. 2 illustrates a diagrammatic representation 200 of tag management models within the object tagging framework that can be implemented by the tag controller 118, in accordance with some examples. As shown in FIG. 2, tag management models include a centralized management model and a decentralized management model. In the centralized management model, the central governance administrator (e.g., user of client device 102 or Governance officer in FIG. 2)) is responsible for creating and tagging objects in the whole account. For example, a central governance administrator can be a compliance administrator who is responsible to associate proper Personally Identifiable Information (PII) tags (e.g., Social Security Numbers) to all the objects in an account.

In a decentralized management model, each of the department administrators or individual object owner (e.g., Team data steward in FIG. 2) is responsible to manage their department specific tag. In both cases, an administrator (e.g., Governance officer or Team data steward in FIG. 2) can discover objects that have association to a particular tag.

In one example, tag management operations can be authorized by role-based access control. Privileges can be further introduced for tag management. These privileges allow for tag management similarly in both centralized and decentralized manner. For example, the "Create Tag on Schema" is a schema level privilege to authorize tag creation operation, the "Apply on Tag" is a privilege on a tag to authorize tag association operation on an entity, and the "Apply tag on Account" is an account level privilege to authorize tag association operation on all the entities within an account.

The tag controller 118 thus provides for a secure tag management system where a tag can be managed either by a centralized governance admin within an account or in a decentralized manner where individual object owners or department administrators manage their own tags.

Tags can be created, deleted, applied, removed, enumerated, and discovered transactionally in a manner that satisfies database transaction properties of: atomicity, consistency, isolation and durability (e.g., or in an ACID-compliant manner). In one example, the ACID-compliance is achieved by storing tags and the tag associations as part of a database's metadata store (e.g., FoundationDB or FDB), which uses a distributed transaction protocol similar to two-phase commit. In another example, the state of the tag controller 118 and at least one of the databases 112, 114, 116 may be placed together in a single database management system (DBMS) on a single machine. These embodiments are an improvement to current tagging systems that do not provide consistent and atomic operations which can result in these current tagging system's controllers being out of sync with the underlying databases for a period of time.

Audit

The tag controller 118 can also perform an audit on Tag create, alter, drop and tag set and unset on the entities and columns operations in response to receiving the commands "Query History" and "Account Usage Schema Views".

In one example, the Query History command (e.g., query_history) requests a view that provides historical data about all the executed queries in an account. This view can contain executed tag create, alter, drop and tag set and unset operations and can be used for audit.

The "Account Usage Schema Views" command requests more tag specific views be added in the account-usage schema. The account usage schema contains a list of views to log historical data and object metadata. For instance, tags specific views can provide a view that contains history of all the tags created and deleted in the past. A tag entity mapping command (e.g., tag_entity_mapping) can request a view that contains the history of all the tag associations created or removed on the objects in the past.

Clone

The tag controller 118 supports cloning for certain entities including, for instance, table, schema and database. When cloning an entity, the tag controller 118 causes the tag associations with source entities to be maintained for the cloned entities (e.g., cloned entities get the same tag associations). When cloning a container (e.g., schema and database), the tags associated with entities in the container are also cloned.

For example, the tag controller 118 can clone a table T1 in a schema to be cloned to table T2. Tag propagation ensures that the table T2 (cloned from T1) will get all the existing tags such that all the objects in table T2 will have the tags as in table T1. However, when cloning the table T1 to table T2, there are two copies of the associations of a given tag in the tables. Accordingly, when a given tag is deleted from table T2, the corresponding tag in table T1 will not be affected.

Create Table with Like

When a table is created with the command "Like", the tag controller 118 causes the tags from the source table to be associated with the target table.

Replication

Figure 3:
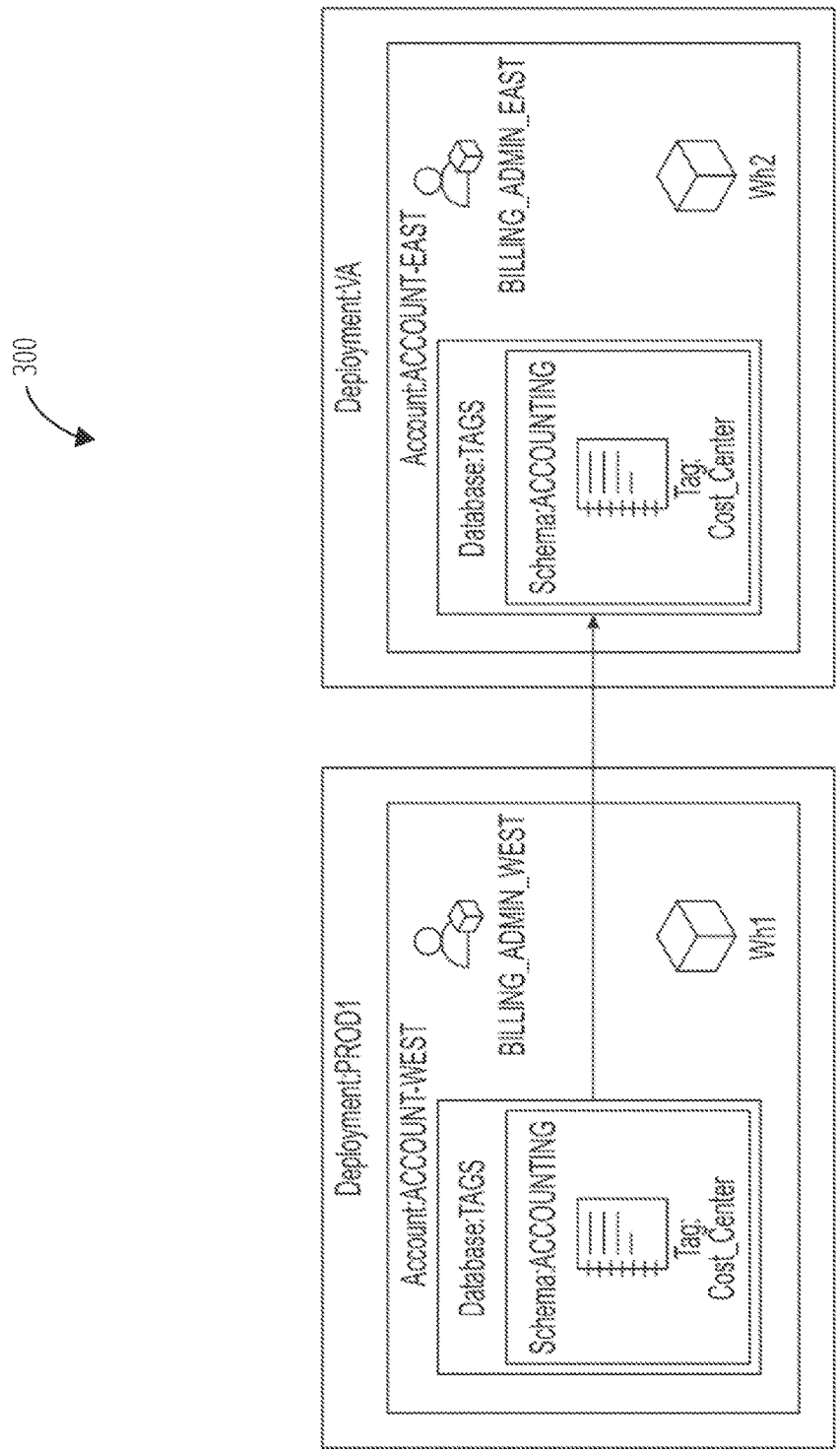
FIG. 3 illustrates a diagrammatic representation of the tag controller implementing replication within the object tagging framework, in accordance with some examples.

FIG. 3 illustrates a diagrammatic representation 300 of the tag controller 118 implementing replication within the object tagging framework, in accordance with some examples. In general, a database can be replicated from one customer account (in one cloud region or storage location) to another customer account (in different region or storage location). Database replication involves replication of the entire primary database (e.g., database 112) to a secondary database (e.g., database 116). The source database can be called the primary database and the target database can be called the secondary database. In database replication, the database is the atomic unit of replication such that it can be replicated in its entirety or not at all.

A tag is a schema level object and it is replicated with the parent database replication. When an entity is replicated as part of the parent database replication, all the associated tags and values are replicated with the database. As shown in FIG. 3, tag controller 118 is replicating the database TAGS from the west account to the east account and the schema accounting and the tag cost_center are replicated with the database TAGS.

As shown in FIG. 3, the tags are not confined to one account in one region but rather the tags are global and can be replicated. In this example, the same tags can be used throughout different accounts because the tags are global and have the same syntax. This allows for cross-platform and cross-region usage of the tags and the customer does not need to perform any configurations at the cloud-level for the tags to function cross-platform.

When a tag is associated with an object in the same database, the tag and object are replicated together because the entire content of the database is replicated together. When a tag is associated with an object in a different database, the two databases may be combined into a replication group and replicated together. In one example, if some referred tags reside outside the replication group, the replication may fail. Similarly, account level entities are replicated with the tags and the replication may fail if some referred tags reside outside the replication group.

Given that the tags are global, it is problematic from an availability and latency perspective to guarantee referential integrity. This introduces the risk that tags can be deleted while still in use in a remote region. To mitigate this possibility, the tag controller 118 can also execute an undelete tag command that undeletes a previously deleted tag and also undeletes the references associated with the previously deleted tag.

Lineage

Figure 4:
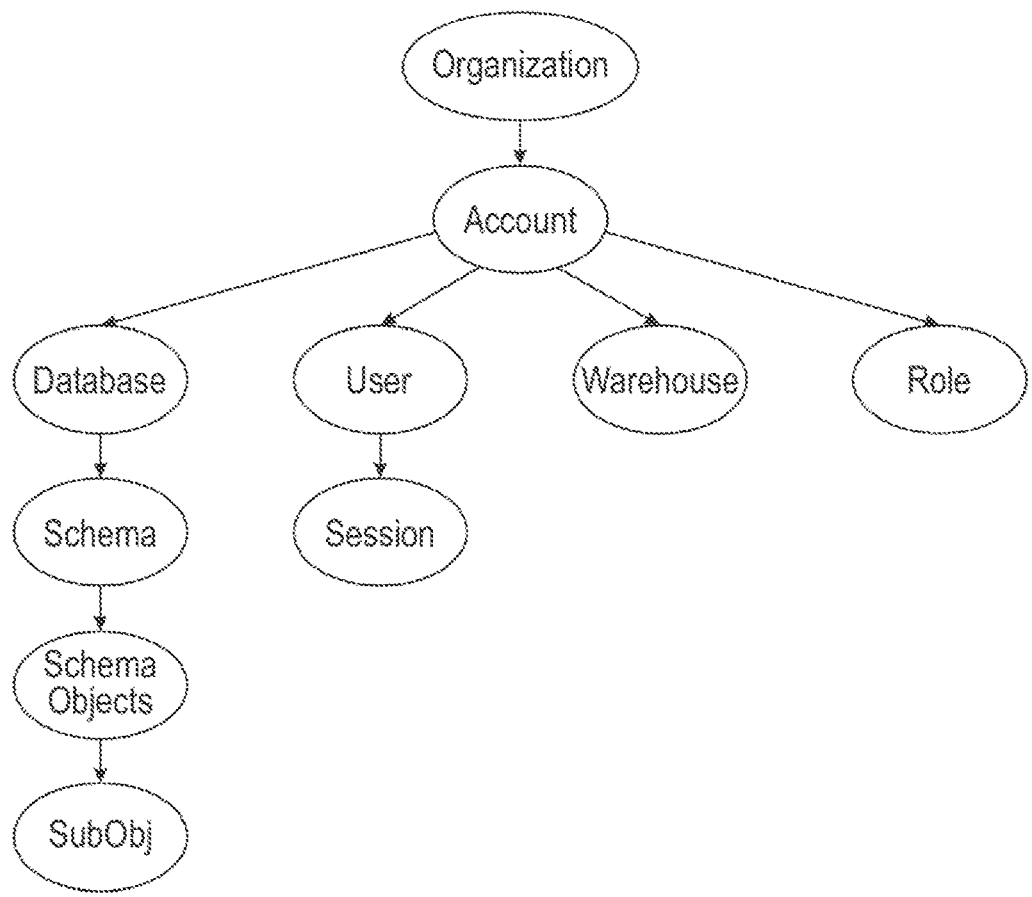
FIG. 4 illustrates a diagrammatic representation of an entity hierarchy for tag lineage, in accordance with some examples.

FIG. 4 illustrates a diagrammatic representation 400 of an entity hierarchy for tag lineage, in accordance with some examples. As shown in FIG. 4, entities are hierarchical such that one entity (e.g., schema) is considered to be a parent of another entity, (e.g., schema objects such as tables). Tag lineage is a feature in the object tagging framework maintained by the tag controller 118 where a tag specified on a parent entity is implicitly inherited by the child entities if child entities do not have the tag (e.g., tag-unassociated). When an entity (e.g., a parent entity or a child entity) already has a tag associated therewith, the entity is considered tag-associated.

Accordingly, a tag specified on a parent level is inherited by all the child entities as a default tag. For instance, a schema with a tag "department" and with a value "engineering" can be considered as a default tag and value (e.g., "department" "engineering") for all the tables in that schema. The default tag and value set to at the schema-level will apply to all current and future tables in that schema. In one example, an individual table can also be set a more specific department tag value, e.g., "dg-engineering". In another example, the tag can be set explicitly on a specific table, which will then override any tags set at the parent level.

Referring back to the FIG. 4, in this entity hierarchy for tag lineage, a table (e.g., schema-object) can inherit a tag from its parent database but it does not inherit a tag from the owner role. The tag controller 118 can support two tag lineage approaches: implicit lineage and explicit lineage.

Implicit Lineage

In the implicit lineage approach, tag lookup for an entity is implicitly tied with the entity hierarchy. When a tag controller 118 determines that a tag is not set on an entity, the tag value of the closest parent of the entity is applied to the entity. For instance, if a tag "department" is not set on a table, the system first looks at the parent schema. If the schema has the tag, it returns the value of the tag. Otherwise, it looks at the parent database of the schema and continues the process.

In this approach, a tag specified in a parent entity will be applied on all the child entities that do not have a tag set thereon. For instance, if a tag "department" is set on a schema, all its child entities, e.g., tables, functions, policies, will inherit that tag. In this example, the inheritance is a tag lookup mechanism that finds the tags from the parent if no tag is set on the child.

To address the scenario where some tags do not require default value specification or where default value lookup may semantically return invalid value (e.g., a tag to capture the creating user of an entity), the customers may use the following functions and can determine which one to use for a tag. First, in response to receiving the "Get Tag" command with an entity as an argument and a tag name, the tag controller 118 returns the value associated with the entity. If the tag provided with the command is not associated, the tag controller 118 traverses up on the lineage in FIG. 4 for example to find the default value. Second, in response to receiving the "Get Local Tag" command with an entity as an argument and a tag name, the tag controller 118 returns the value associated with the entity. However, the tag controller 118 does not traverse up on the lineage to find the default value in response to the "Get Local Tag" command.

Explicit Lineage

In order to solve the limitation of the implicit lineage, the explicit lineage approach requires that each tag explicitly mention the lineage by the property of a tag using "target object lineage." A tag can have multiple lineages encoded in "target object lineage." In one example, the tag controller 118 can cause the association of a tag on an entity to fail if the entity is not in the specified lineage of the tag.

Tag Propagation

In one example, some tags can be propagated by tag controller 118 from one entity to another entity in some operational context. The operation context can include, for example, cloning an object, creating a table as select from another table, creating a view from another view, etc.

For instance, when a view created on the table EMPLOYEE_INFO, the PII tag of column ADDRESS of the table should be propagated to corresponding view column. Given a set of tags and their values that can be assigned to an object, the tag controller 118 can perform tag refinement to decide which subset of tags (with values) to assign.

Use Cases for Object Tagging Framework—Cost Governance

Figure 5:
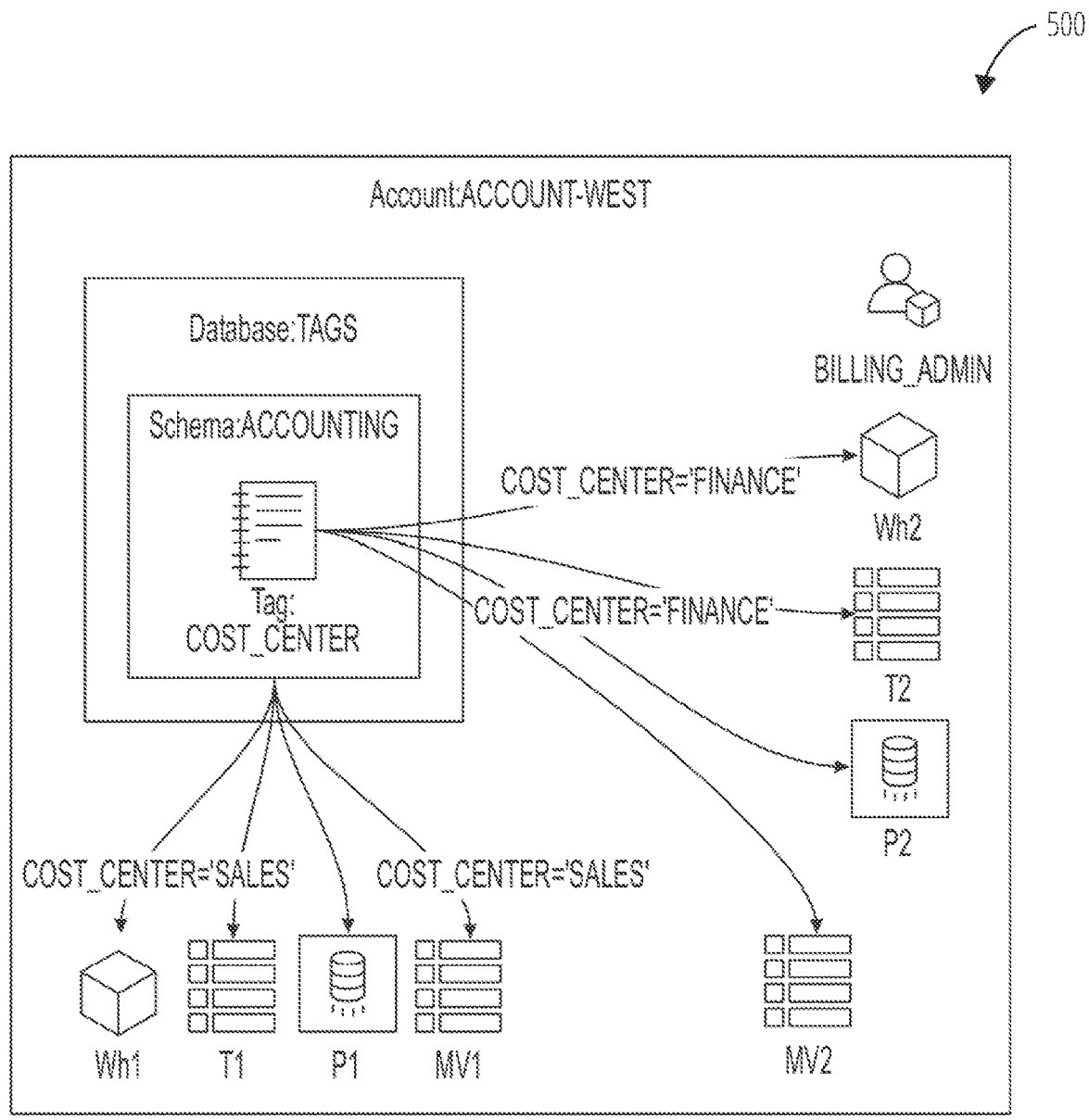
FIG. 5 illustrates a diagrammatic representation of the tag controller implementing an object tagging framework, in accordance with some examples.

FIG. 5 illustrates a diagrammatic representation 500 of the tag controller 118 implementing an object tagging framework, in accordance with some examples. FIG. 5 illustrates an example use case of cost governance where resource usage can be tracked for cost visibility. In this use case example, the customers have a single account or the customers have multiple accounts that are managed using an organization.

As shown in FIG. 5, the customer has two cost centers: sales and finance. The goal for the customer is to track usage of the resources that result for example in costs (e.g., credits spent). In this example, the billing administrator via client device 102 creates a tag called Cost_Center in a centralized database Tags.

It is understood that the database Tags is used to exemplify the scenario and centrally managed artifacts (tags, policies, etc.) can be stored in a separate (central) database or location. A tag can be created in any database.

The billing administrator then associates the tag Cost_Center to the objects with values Sales and Finance, respectively. As shown in FIG. 5, Warehouse 1, Table 1, Pipe 1, Materialized View 1 are associated with Cost_Center, Sales and Warehouse 2, Table 2, Pipe 2, Materialized View 2 are associated with Cost_Center, Finance.

There are two administrators Sales_Admin and Finance_Admin that manage objects that belong to sales and finance respectively. Tag administrator grants the tag Cost_Center to them so that they can associate tag on their objects. Sales_Admin associates Cost_Center to the objects with value 'SALES' and Finance_Admin associates Cost_Center to the objects with value 'Finance'.

Using queries and the tags, the administrator can obtain and monitor the credits being spent (cost) associated with the finance objects and the sales objects, respectively.

Use Cases for Object Tagging Framework—Data Governance, Security, Compliance

Figure 6:
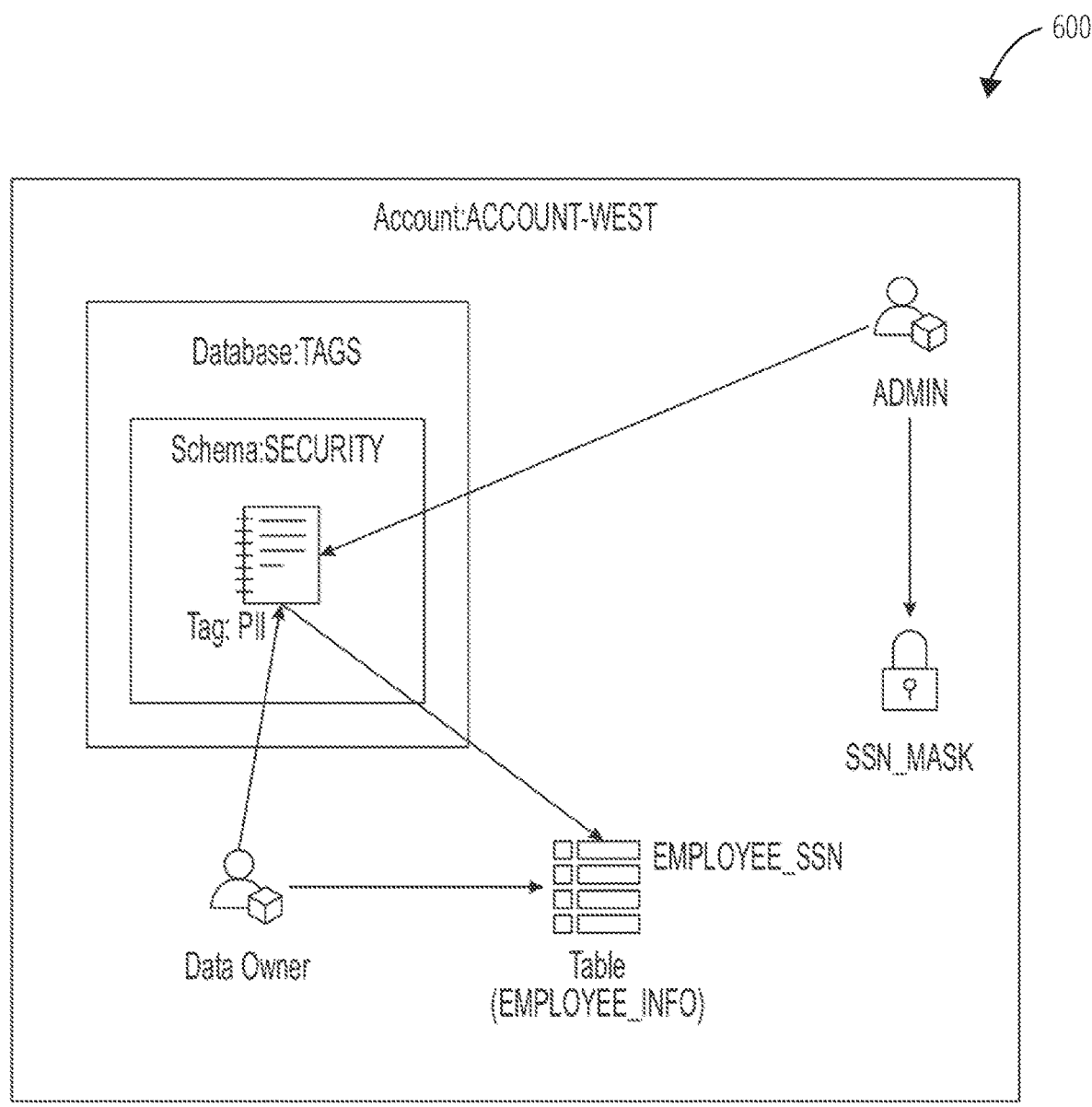
FIG. 6 illustrates a diagrammatic representation of the tag controller implementing an object tagging framework, in accordance with some examples.

FIG. 6 illustrates a diagrammatic representation 600 of the tag controller implementing an object tagging framework, in accordance with some examples. FIG. 6 illustrates an example use case of data governance, security, and compliance where data objects within database service system 100 that represent sensitive information (e.g., PII) are classified. In this use case example, an audit for classified columns within the single account or within the organization can be performed and policy can be enforced for the classified columns.

In this example, the goal is to facilitate PII tracking by eliminating the need of a table owner to notify policy admin about column containing PII.

As shown in FIG. 6, the data owner owns a table EMPLOYEE_INFO which has a column EMPLOYEE_SSN. The administrator has a masking policy SSN_MASK to mask social security numbers and periodically audits if a table column containing social security number skipped SSN_MASK enforcement.

The administrator can create a tag called PII which is a centrally defined tag to efficiently discover classified objects as PII. The administrator grants "apply" privilege on PII to Data Owner in FIG. 6. In this example, decentralized management approach is implemented where the individual object owner or data steward can tag the PII data in their table EMPLOYEE_INFO. In this example, the Data Owner binds tag PII and a value 'SSN' to EMPLOYEE_SSN column of table EMPLOYEE_INFO. The Data Owner classifies their data in table EMPLOYEE_INFO with a centrally defined PII tag.

Using queries and the tags, the administrator can find all the columns with the tag TAGS.SECURITY.PII:'SSN' that do not have a masking policy association. Accordingly, the administrator is able to take action based on the centrally defined tag PII.

Use Cases for Object Tagging Framework—Data and Tag Sharing

Figure 7:
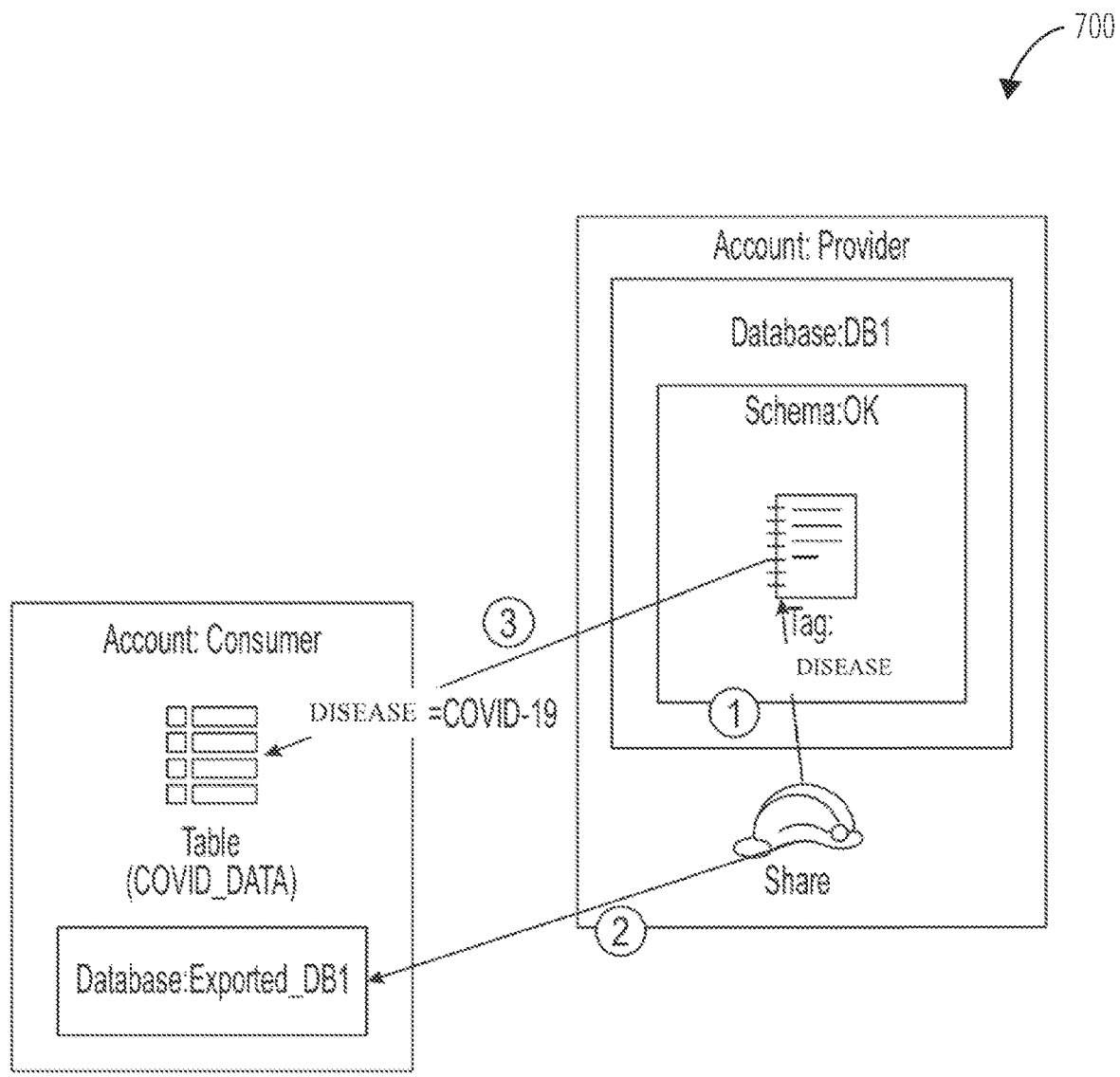
FIG. 7 illustrates a diagrammatic representation of the tag controller implementing an object tagging framework, in accordance with some examples.

FIG. 7 illustrates a diagrammatic representation 700 of the tag controller implementing an object tagging framework, in accordance with some examples.

In one example, one account (provider) can share a tag in a shared database with consumers. Each consumer can also correspond to an account. In one example, the provider account can be sharing an object with another account that is not part of the same organization. The provider can create a tag "disease" in the schema.

The privilege "apply" on the tag "disease" can be granted to a share in a provider account as shown in FIG. 7. The shared tag is a read only in a consumer account.

The provider account may be sharing data from an entity (e.g., a schema) on a novel disease with a number of providers and consumers. In this example, the actual object (e.g., schema with data on the disease) is shared as read-only such that the consumer gets the object but cannot modify it.

A consumer account can associate the shared tag to an object in the consumer account (e.g., table Covid_Data in FIG. 7). The consumer account can discover objects by shared tag if the object is owned by the consumer account or if the object is shared to the consumer account. The provider is thus able to share data and all the annotations on the data while the consumers can use the tag to annotate their own objects.

While the FIG. 7 illustrates data and tag sharing within a local region, it is understood that a tag can be a globally listed tag such that the data and tag are shared between multiple regions (e.g., globally). In this example, in the local region, a tag can be shared in a shared database from a DX_Admin (Data Exchange Administrator) to both DX_Provider (Data Exchange Provider) and DX_Consumer (Data Exchange Consumer) accounts. The DX_Provider and DX_Consumer mount the database from share. DX_Provider can apply the tag to a listing that it owns. The tag is mapped to a listing by the global ID of the listing. DX_Consumer can discover listings in a DX by a shared tag if the consumer is a member of the same DX.

In the remote region, the DX_Admin replicates the tag from local region to remote region. In the remote region, the same tag is applied to the listing and DX_Admin shares the tag to DX_Consumer. The DX_Consumer in the remote region discovers the listing in a DX by the shared tag.

Process of Implementing Object Tagging: Lineage

Although the described flowcharts can show operations as a sequential process, many of the operations can be performed in parallel or concurrently. In addition, the order of the operations may be rearranged. A process is terminated when its operations are completed. A process may correspond to a method, a procedure, an algorithm, etc. The operations of methods may be performed in whole or in part, may be performed in conjunction with some or all of the operations in other methods, and may be performed by any number of different systems, such as the systems described herein, or any portion thereof, such as a processor included in any of the systems. For example, the processes can be performed by the tag controller 118 or a processor included in the tag controller 118, or a processor in tag service manager 108, or a combination thereof.

Figure 8:
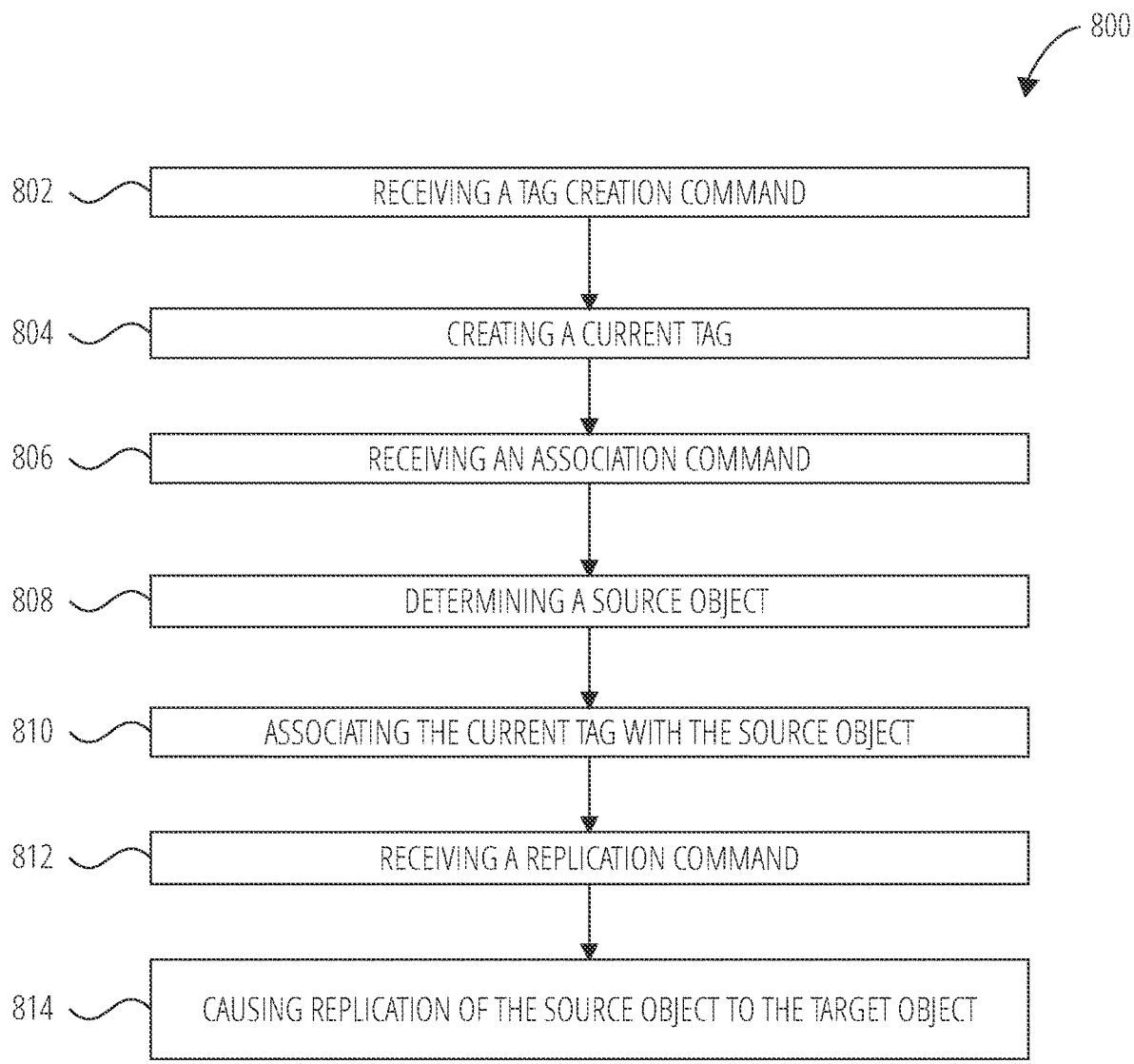
FIG. 8 illustrates a process 800 of implementing an object tagging framework in accordance with one embodiment.

FIG. 8 illustrates a process 800 of implementing an object tagging framework in accordance with one embodiment.

At operation 802, a processor in the tag controller 118 receives a tag creation command including a tag name.

At operation 804, in response to the tag creation command, the tag controller 118 creates a current tag with the tag name. The current tag can be an object entity.

At operation 806, the processor receives an association command, the tag name and a source object identifier.

At operation 808, the processor determines a source object associated with the source object identifier. The source object can include a tag value. Referring to FIG. 5, for example, the source object identifier can be an identifier "Warehouse (Wh) 1" and the tag value can be "Sales" and the current tag can be "Cost_Center".

At operation 810, the processor associates the current tag with the target object. In one example, in response to receiving the association command, the processor determines that the source object is tag-associated. For instance, the target object can be associated with a previous tag. In this example, the processor then overwrites the previous tag using the current tag.

At operation 812, the processor receives a replication command including the source object and a target object. As shown in FIG. 3, the replication command can be for a replication of a database from the account in the west (e.g., Account: Account-West) to a database in an account in the east (e.g., Account: Account-East).

At operation 814, the processor causes replication of the source object to the target object. In one example, the processor causes replication by replicating the current tag with the tag name and the tag value in the source object to the target object. Referring to FIG. 3, the source database "TAGS" is being replicated from the Warehouse 1 "Wh1" to Warehouse 2 "Wh2". As shown in FIG. 3, the tag name "Cost_Center" that is applied at a schema level (e.g., Schema: Accounting) is being replicated to from the account in the West to the account in the East.

In one example, the processor can further cause replication by identifying a child source object of the source object. For instance, the source object and the child source object are hierarchical objects. Referring to FIG. 4, the source object can be the account entity and the child source object can be the database entity, the user entity, the warehouse entity, or the role entity. In one example, the child object can also be the schema entity, the schema objects entity, the sub-objects entity or the session entity.

The processor can determine a child tag name associated with the child source object and a child tag value associated with the child source object and replicate the child source object to a child target object of the target object. In one example, the processor replicates the child source object to the child target object by further replicating the child tag name and the child tag value from the child source object to the child target object. In this example, the target object and the child target object are hierarchical objects.

Referring to FIG. 4, the target object can be the account entity and the child target object can be the database entity, the user entity, the warehouse entity, or the role entity. In one example, the child object can also be the schema entity, the schema objects entity, the sub-objects entity or the session entity. Accordingly, the tags associated with the child objects within the source object are also replicated to the target object.

In one example, in response to receiving a query including the tag name, the processor generates an output based on the tag name. In one example, the output includes a list of entities associated with the tag name.

The processor, in another example, can receive a tag delete command including the tag name. The processor, in response to receiving the tag delete command, can remove the tag name from the target object and the source object.

In another example, the processor receives a tag delete command including the tag name and the target object. In response to receiving the tag delete command, the processor removes the tag name from the target object, and causes no change to the tag name of the source object.

The processor can also receive a tag undelete command including the tag name. In response to receiving the tag undelete command, the processor undeletes the tag name and the tag value by associating the current tag with the tag name and the tag value to the target object and the source object.

Machine Architecture

Figure 9:
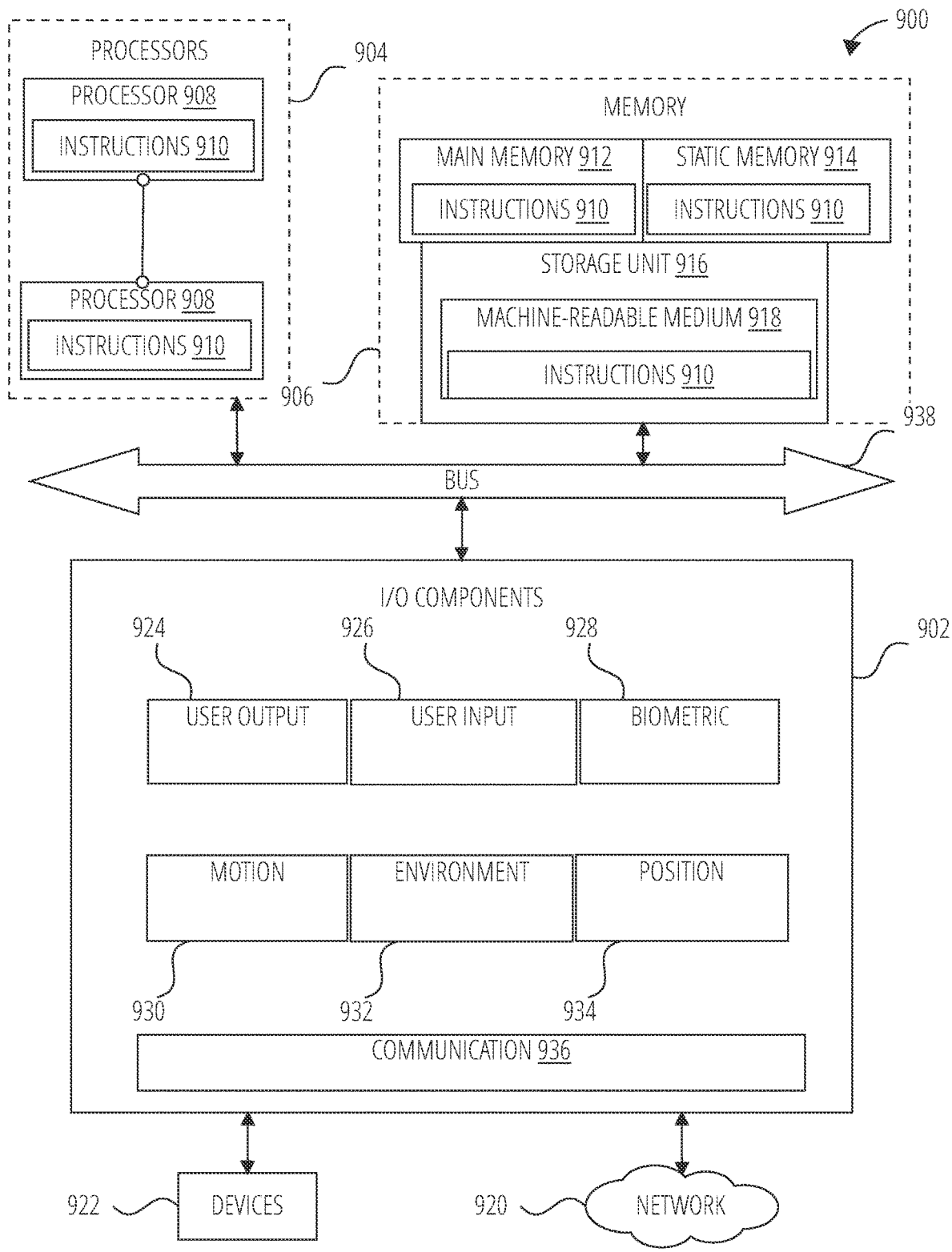
FIG. 9 is a diagrammatic representation of a machine in the form of a computer system within which a set of instructions may be executed for causing the machine to perform any one or more of the methodologies discussed herein, in accordance with some example embodiments.

FIG. 9 is a diagrammatic representation of the machine 900 within which instructions 910 (e.g., software, a program, an application, an applet, an app, or other executable code) for causing the machine 900 to perform any one or more of the methodologies discussed herein may be executed. For example, the instructions 910 may cause the machine 900 to execute any one or more of the methods described herein. The instructions 910 transform the general, non-programmed machine 900 into a particular machine 900 programmed to carry out the described and illustrated functions in the manner described. The machine 900 may operate as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 910, sequentially or otherwise, that specify actions to be taken by the machine 900. Further, while only a single machine 900 is illustrated, the term "machine" shall also be taken to include a collection of machines that individually or jointly execute the instructions 910 to perform any one or more of the methodologies discussed herein. The machine 900, for example, may comprise the client device 102 or any one of a number of server devices forming part of the Tag service manager 108. In some examples, the machine 900 may also comprise both client and server systems, with certain operations of a particular method or algorithm being performed on the server-side and with certain operations of the particular method or algorithm being performed on the client-side.

The machine 900 may include processors 904, memory 906, and input/output I/O components 902, which may be configured to communicate with each other via a bus 938. In an example, the processors 904 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, at least one processor 908 that execute the instructions 910. The term "processor" is intended to include multi-core processors that may comprise two or more independent processors (sometimes referred to as "cores") that may execute instructions contemporaneously. Although FIG. 9 shows multiple processors 904, the machine 900 may include a single processor with a single-core, a single processor with multiple cores (e.g., a multi-core processor), multiple processors with a single core, multiple processors with multiples cores, or any combination thereof.

The memory 906 includes a main memory 912, a static memory 914, and a storage unit 916, both accessible to the processors 904 via the bus 938. The main memory 906, the static memory 914, and storage unit 916 store the instructions 910 embodying any one or more of the methodologies or functions described herein. The instructions 910 may also reside, completely or partially, within the main memory 912, within the static memory 914, within machine-readable medium 918 within the storage unit 916, within at least one of the processors 904 (e.g., within the processor's cache memory), or any suitable combination thereof, during execution thereof by the machine 900.

The I/O components 902 may include a wide variety of components to receive input, provide output, produce output, transmit information, exchange information, capture measurements, and so on. The specific I/O components 902 that are included in a particular machine will depend on the type of machine. For example, portable machines such as mobile phones may include a touch input device or other such input mechanisms, while a headless server machine will likely not include such a touch input device. It will be appreciated that the I/O components 902 may include many other components that are not shown in FIG. 9. In various examples, the I/O components 902 may include user output components 924 and user input components 926. The user output components 924 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 926 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 902 may include biometric components 928, motion components 930, environmental components 932, or position components 934, among a wide array of other components. For example, the biometric components 928 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 930 include acceleration sensor components (e.g., accelerometer), gravitation sensor components, rotation sensor components (e.g., gyroscope).

The environmental components 932 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

The position components 934 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 902 further include communication components 936 operable to couple the machine 900 to a network 920 or devices 922 via respective coupling or connections. For example, the communication components 936 may include a network interface component or another suitable device to interface with the network 920. In further examples, the communication components 936 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 922 may be another machine or any of a wide variety of peripheral devices (e.g., a peripheral device coupled via a USB).

Moreover, the communication components 936 may detect identifiers or include components operable to detect identifiers. For example, the communication components 936 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 936, such as location via Internet Protocol (IP) geolocation, location via Wi-Fi® signal triangulation, location via detecting an NFC beacon signal that may indicate a particular location, and so forth.

The various memories (e.g., main memory 912, static memory 914, and memory of the processors 904) and storage unit 916 may store one or more sets of instructions and data structures (e.g., software) embodying or used by any one or more of the methodologies or functions described herein. These instructions (e.g., the instructions 910), when executed by processors 904, cause various operations to implement the disclosed examples.

The instructions 910 may be transmitted or received over the network 920, using a transmission medium, via a network interface device (e.g., a network interface component included in the communication components 936) and using any one of several well-known transfer protocols (e.g., hypertext transfer protocol (HTTP)). Similarly, the instructions 910 may be transmitted or received using a transmission medium via a coupling (e.g., a peer-to-peer coupling) to the devices 922.

Software Architecture

Figure 10:
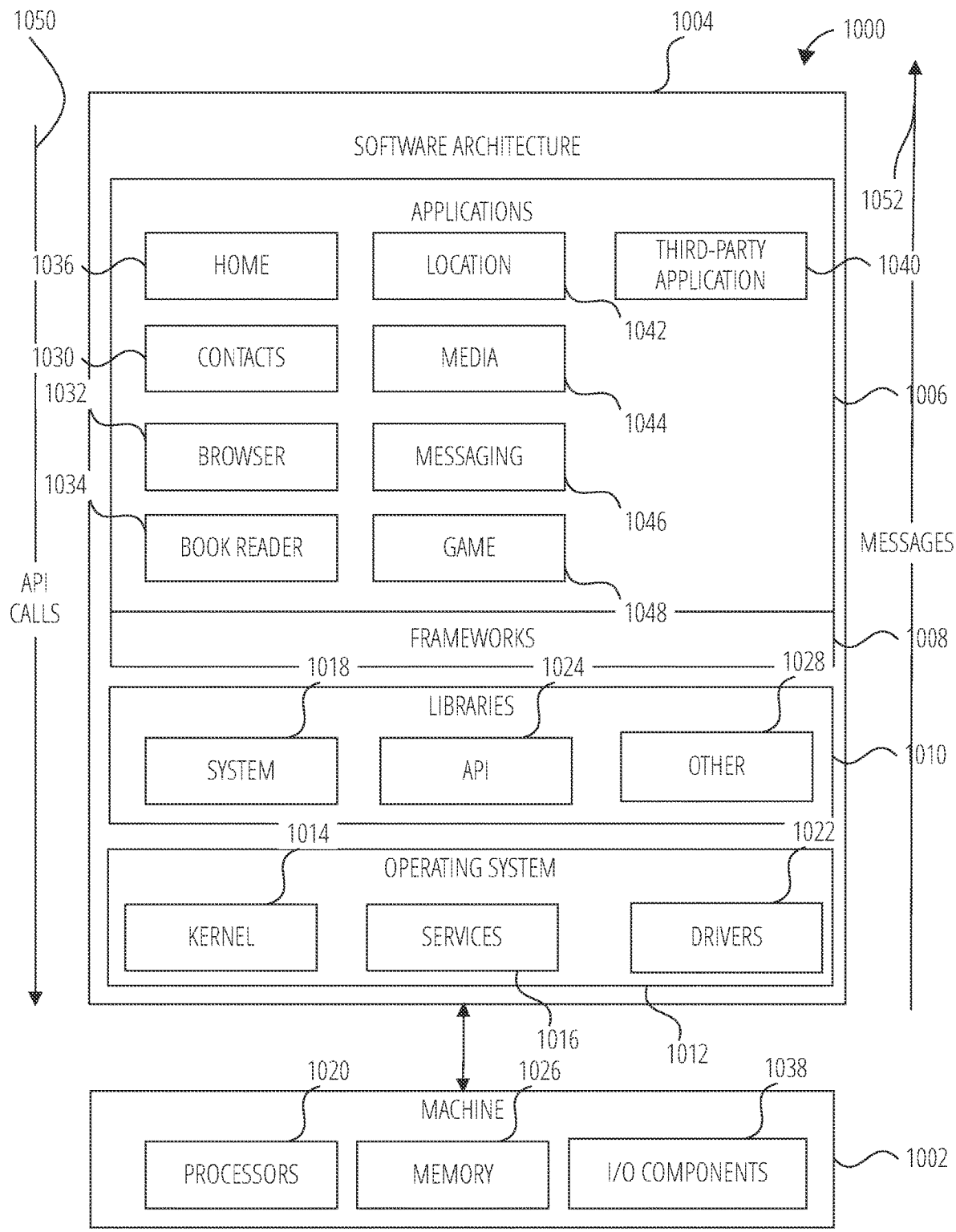
FIG. 10 is a block diagram showing a software architecture within which the present disclosure may be implemented, according to an example embodiment.

FIG. 10 is a block diagram 1000 illustrating a software architecture 1004, which can be installed on any one or more of the devices described herein. The software architecture 1004 is supported by hardware such as a machine 1002 that includes processors 1020, memory 1026, and I/O components 1038. In this example, the software architecture 1004 can be conceptualized as a stack of layers, where each layer provides a particular functionality. The software architecture 1004 includes layers such as an operating system 1012, libraries 1010, frameworks 1008, and applications 1006. Operationally, the applications 1006 invoke API calls 1050 through the software stack and receive messages 1052 in response to the API calls 1050.

The operating system 1012 manages hardware resources and provides common services. The operating system 1012 includes, for example, a kernel 1014, services 1016, and drivers 1022. The kernel 1014 acts as an abstraction layer between the hardware and the other software layers. For example, the kernel 1014 provides memory management, processor management (e.g., scheduling), component management, networking, and security settings, among other functionality. The services 1016 can provide other common services for the other software layers. The drivers 1022 are responsible for controlling or interfacing with the underlying hardware. For instance, the drivers 1022 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 1010 provide a common low-level infrastructure used by the applications 1006. The libraries 1010 can include system libraries 1018 (e.g., C standard library) that provide functions such as memory allocation functions, string manipulation functions, mathematic functions, and the like. In addition, the libraries 1010 can include API libraries 1024 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1010 can also include a wide variety of other libraries 1028 to provide many other APIs to the applications 1006.

The frameworks 1008 provide a common high-level infrastructure that is used by the applications 1006. For example, the frameworks 1008 provide various graphical user interface (GUI) functions, high-level resource management, and high-level location services. The frameworks 1008 can provide a broad spectrum of other APIs that can be used by the applications 1006, some of which may be specific to a particular operating system or platform.

In an example, the applications 1006 may include a home application 1036, a contacts application 1030, a browser application 1032, a book reader application 1034, a location application 1042, a media application 1044, a messaging application 1046, a game application 1048, and a broad assortment of other applications such as a third-party application 1040. The applications 1006 are programs that execute functions defined in the programs. Various programming languages can be employed to create one or more of the applications 1006, structured in a variety of manners, such as object-oriented programming languages (e.g., Objective-C, Java, or C++) or procedural programming languages (e.g., C or assembly language). In a specific example, the third-party application 1040 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1040 can invoke the API calls 1050 provided by the operating system 1012 to facilitate functionality described herein.

GLOSSARY

"Carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors 1020 or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"Computer-readable storage medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

What is claimed is:

1. A computer-implemented object tagging method for a database, comprising:
   receiving from an administrator of the database, a tag creation command including a tag name;
   in response to the tag creation command, creating a tag for classifying sensitive information in objects of the database;
   granting an apply privilege of the tag to a data owner of an object of the database;
   in response to a bind command from the data owner, generating a tagged object based on the tag and the object of the database, the tagged object containing sensitive information; and
   in response to a request from the database administrator during an audit, performing operations comprising:
      finding the tagged object of the database using the tag;
      determining whether the tagged object of the database is associated with a masking policy set by the administrator; and
      in response to determining the tagged object is unassociated with the masking policy, associating the tagged object with the masking policy to mask the sensitive information.

2. The computer-implemented object tagging method of claim 1,
   wherein the data owner is associated with a consumer account of a first organization, and the administrator is associated with a provider account of a second organization, and
   wherein the first organization and the second organization are not a same organization.

3. The computer-implemented object tagging method of claim 1, wherein the mask comprises a personally identifiable information mask.

4. The computer-implemented object tagging method of claim 3, wherein the personally identifiable information mask comprises a social security number mask.

5. The computer-implemented object tagging method of claim 1, wherein the tag comprises a personally identifiable information tag.

6. The computer-implemented object tagging method of claim 1, further comprising:
   in response to receiving a query including the tag name, generating an output based on the tag name.

7. The computer-implemented object tagging method of claim 1, further comprising:
   controlling access to the tag based on one or more user roles.

8. A system for implementing an object tagging framework for a database, comprising:
   one or more processors; and
   a memory storing instructions that, when executed by the one or more processors, cause the system to perform operations comprising:
      receiving from an administrator of the database, a tag creation command including a tag name;
      in response to the tag creation command, creating a tag for classifying sensitive information in objects of the database;
      granting an apply privilege of the tag to a data owner of an object of the database;
      in response to a bind command from the data owner, generating a tagged object based on the tag and the object of the database, the tagged object containing sensitive information; and
      in response to a request from the database administrator during a periodic audit, performing operations comprising:
         finding the tagged object of the database using the tag;
         determining whether the tagged object of the database is associated with a masking policy set by the administrator; and
         in response to determining the tagged object is unassociated with the masking policy, associating the tagged object with the masking policy to mask the sensitive information.

9. The system for implementing an object tagging framework for a database of claim 8,
   wherein the data owner is associated with a consumer account of a first organization, and the administrator is associated with a provider account of a second organization, and
   wherein the first organization and the second organization are not a same organization.

10. The system for implementing an object tagging framework for a database of claim 8, wherein the mask comprises a personally identifiable information mask.

11. The system for implementing an object tagging framework for a database of claim 10, wherein the personally identifiable information mask comprises a social security number mask.

12. The system for implementing an object tagging framework for a database off claim 8, wherein the tag comprises a personally identifiable information tag.

13. The system for implementing an object tagging framework for a database of claim 8, wherein the instructions when executed further cause the system to perform operations comprising:
    in response to receiving a query include the tag name, generating an output based on the tag name.

14. The system for implementing an object tagging framework for a database of claim 8, wherein the instructions when executed further cause the system to perform operations comprising:
    controlling access to the tag based on one or more user roles.

15. A non-transitory computer-readable storage medium, the computer-readable storage medium including instructions that when executed by a computer, cause the computer to perform operations comprising:
    receiving from an administrator of the database, a tag creation command including a tag name;
    in response to the tag creation command, creating a tag for classifying sensitive information in objects of the database;
    granting an apply privilege of the tag to a data owner of an object of the database;
    in response to a bind command from the data owner, generating a tagged object based on the tag and the object of the database, the tagged object containing sensitive information; and in response to a request from the database administrator during a periodic audit, performing operations comprising:
  finding the tagged object of the database using the tag;
  determining whether the tagged object of the database is associated with a masking policy set by the administrator; and
  in response to determining the tagged object is unassociated with the masking policy, associating the tagged object with the masking policy to mask the sensitive information.

16. The non-transitory computer-readable storage medium of claim 15,
  wherein the data owner is associated with a consumer account of a first organization, and the administrator is associated with a provider account of a second organization, and
  wherein the first organization and the second organization are not a same organization.

17. The non-transitory computer-readable storage medium of claim 15, wherein the mask comprises a personally identifiable information mask.

18. The non-transitory computer-readable storage medium of claim 17, wherein the personally identifiable information mask comprises a social security number mask.

19. The non-transitory computer-readable storage medium of claim 15, wherein the tag comprises a personally identifiable information tag.

20. The non-transitory computer-readable storage medium of claim 15, wherein the instructions when executed further cause the computer to perform operations comprising:
  controlling access to the tag based on one or more user roles.

* * * * *